GOTTLIEB SCHERER.
Improvement in Pan Scrapers.

No. 119,791.  Patented Oct. 10, 1871.

UNITED STATES PATENT OFFICE.

GOTTLIEB SCHERER, OF SOUTH BOSTON, MASSACHUSETTS.

IMPROVEMENT IN PAN-SCRAPERS.

Specification forming part of Letters Patent No. 119,791, dated October 10, 1871.

*To all whom it may concern:*

Be it known that I, GOTTLIEB SCHERER, of South Boston, in the county of Suffolk and State of Massachusetts, have invented certain new and useful Improvements in Pan-Scrapers; and I do hereby declare that the following is a full, clear, and exact description thereof, which will enable others skilled in the art to make and use the same, reference being had to the accompanying drawing forming part of this specification, in which—

Figure 1:
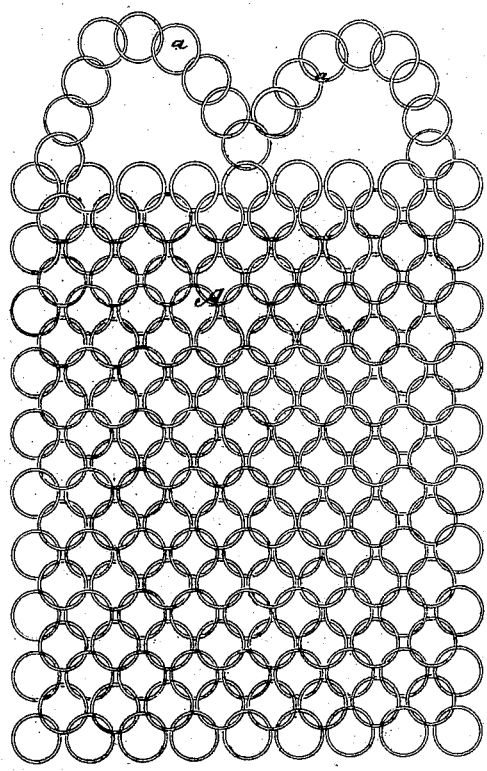
Figure 2:

Figure 1 is a plan view of my improved pan-scraper. Fig. 2 is a detail edge view of a modified form of the same.

Similar letters of reference indicate corresponding parts.

My invention has for its object to furnish an improved pan-scraper or metallic dish-cloth for scraping and cleaning pans, kettles, &c., which shall be simple in construction and effective in use, cleaning the pans quickly and thoroughly; and it consists in the pan-scraper constructed as hereinafter more fully described.

The pan-scraper A is formed of iron rings interlocked with each other to form a net-work or cloth, as shown in Fig. 1. At one end of the scraper A is formed one or more loops, *a*, also made of iron rings, for convenience in hanging up the scraper when not in use. When it is desired to make a heavier scraper one-half of the rings may be made double—that is to say, formed of two coils of wire, as shown in Fig. 2.

The scraper thus constructed is rubbed over the surface of a pan in the same manner as an ordinary dish-cloth, and does its work quickly and thoroughly, leaving the surface clean and smooth.

Having thus described my invention, I claim as new and desire to secure by Letters Patent—

An improved pan-scraper formed of iron rings interlocked with each other, substantially as herein shown and described, as a new article of manufacture.

The above specification of my invention signed by me this 26th day of August, 1871.

GOTTLIEB SCHERER.

Witnesses:
JAMES T. GRAHAM,
T. B. MOSHER.

(88)